(12) United States Patent
Zhao et al.

(10) Patent No.: US 8,392,657 B2
(45) Date of Patent: Mar. 5, 2013

(54) MONITORING CACHE USAGE IN A DISTRIBUTED SHARED CACHE

(75) Inventors: Li Zhao, Beaverton, OR (US); Ravishankar Iyer, Portland, OR (US); Rameshkumar G. Illikkal, Portland, OR (US); Erik G. Hallnor, Beaverton, OR (US); Martin G. Dixon, Portland, OR (US); Donald K. Newell, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 619 days.

(21) Appl. No.: 12/587,670

(22) Filed: Oct. 9, 2009

(65) Prior Publication Data

US 2011/0087843 A1  Apr. 14, 2011

(51) Int. Cl.
*G06F 12/00* (2006.01)
*G06F 13/00* (2006.01)
*G06F 13/28* (2006.01)

(52) U.S. Cl. ........................................ 711/121; 711/122

(58) Field of Classification Search .......... 711/118–119, 711/121–122
See application file for complete search history.

(56) References Cited

U.S. PATENT DOCUMENTS

| | | | |
|---|---|---|---|
| 6,587,937 B1 * | 7/2003 | Jensen et al. | 711/173 |
| 2009/0006755 A1 * | 1/2009 | Illikkal et al. | 711/126 |

* cited by examiner

*Primary Examiner* — Christian P Chace
*Assistant Examiner* — Ryan Bertram
(74) *Attorney, Agent, or Firm* — Jackson Walker L.L.P.

(57) ABSTRACT

An apparatus, method, and system are disclosed. In one embodiment the apparatus includes a cache memory, which a number of sets. Each of the sets in the cache memory have several cache lines. The apparatus also includes at least one process resource table. The process resource table maintains a cache line occupancy count of a number of cache lines. Specifically, the cache line occupancy count for each cache line describes the number of cache lines in the cache storing information utilized by a process running on a computer system. Additionally, the process resource table stores the occupancy count of less cache lines than the total number of cache lines in the cache memory.

17 Claims, 9 Drawing Sheets

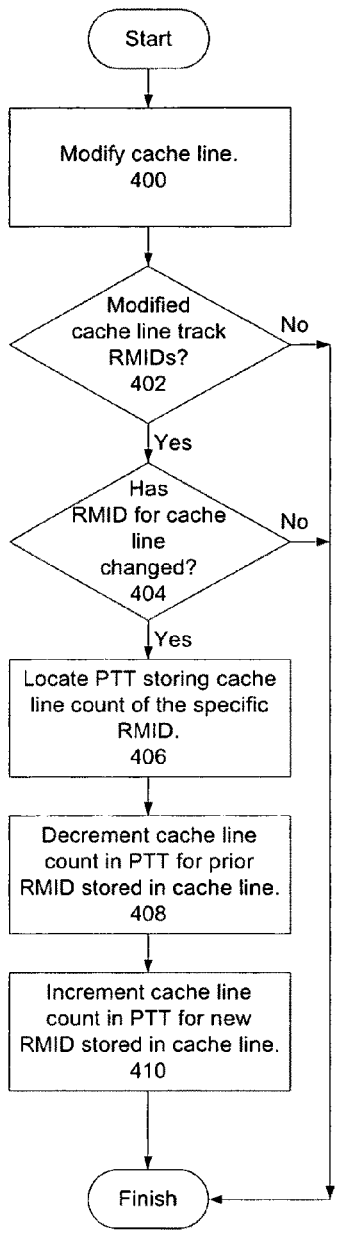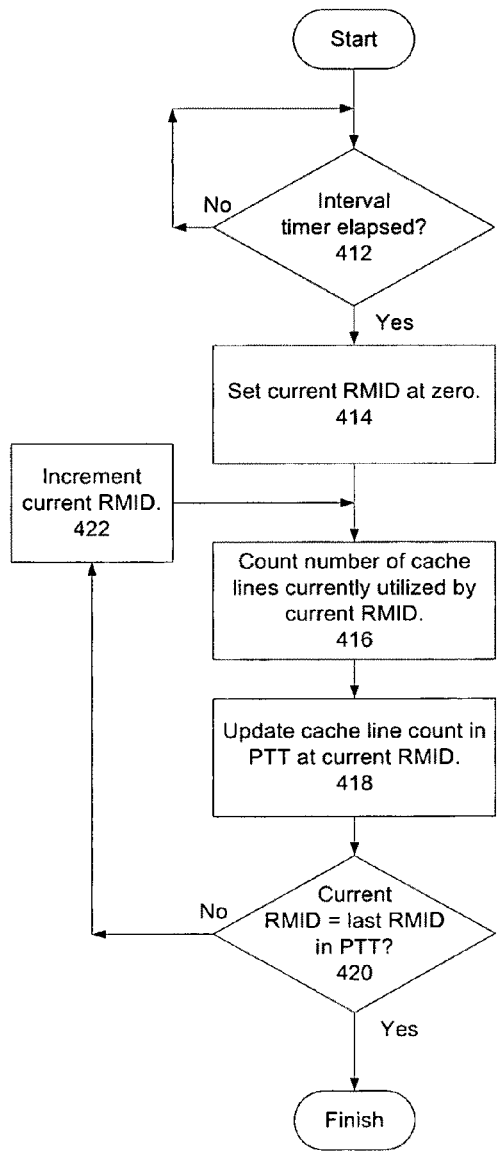
FIG. 4A
FIG. 4B

MONITORING CACHE USAGE IN A DISTRIBUTED SHARED CACHE

FIELD OF THE INVENTION

This invention relates to monitoring multi-core processor cache utilization.

BACKGROUND OF THE INVENTION

As multi-core processor architecture is widely adopted in both server and client platforms, multiple applications/processes (or VMs) will run simultaneously, contending for shared resources like a last level cache.

BRIEF DESCRIPTION OF THE DRAWINGS

The present invention is illustrated by way of example and is not limited by the drawings, in which like references indicate similar elements, and in which:

FIG. 4A is a flow diagram of an embodiment of a process to dynamically update a PRT when an RMID is modified in a sampled set.

FIG. 4B is a flow diagram of an embodiment of a process to update a PRT on an interval basis.

DETAILED DESCRIPTION OF THE INVENTION

Figure 1:
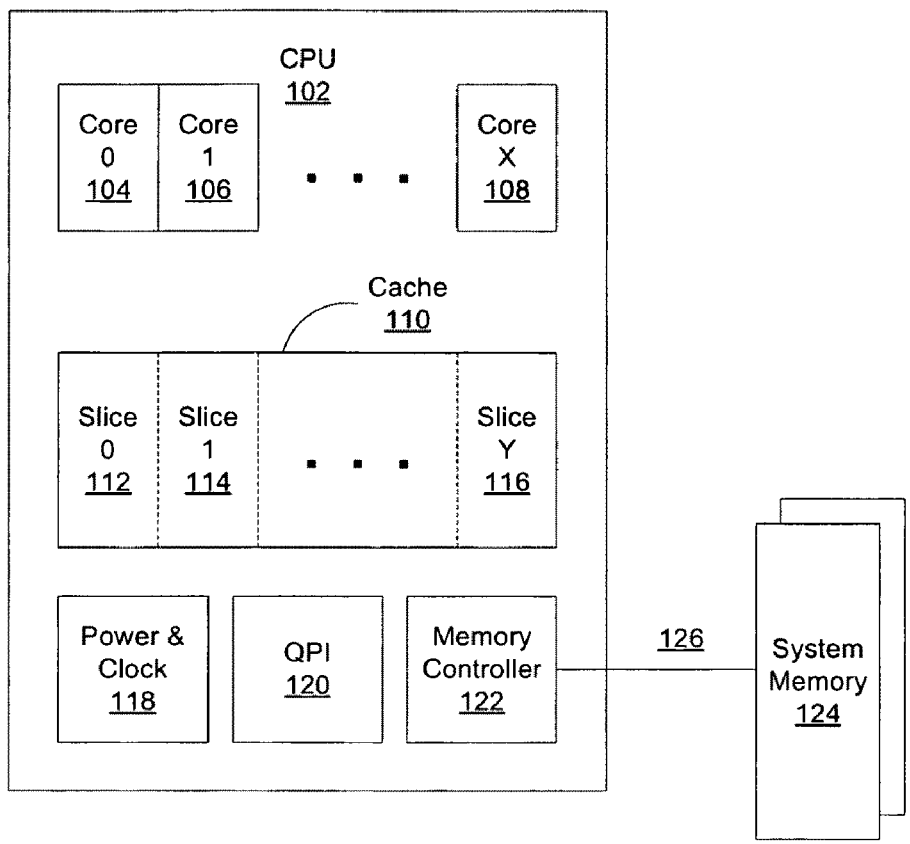
FIG. 1 illustrates an embodiment of a general purpose computer system to monitor cache usage in a distributed shared cache.

Embodiments of an apparatus, method, and system for monitoring cache usage in a distributed shared cache are described.

Monitoring resource usage (cache occupancy, reuse, interference, etc.) for each application and providing the information to OS or administrator/user can help achieve better scheduling, better resource allocation and charge back.

In many embodiments, a computer system with a multi-core processor that includes a cache memory has one or more process resource tables available. The one or more process resource tables are utilized to track the usage of at least a sampling of cache lines. Specifically, the sample of cache lines of the cache include a resource monitoring identification (RMID) field, which identifies, per cache line, the process running in the computer system that is currently utilizing that cache line. The process resource table(s) keep track of a working count of cache lines per RMID value. For example, process 1 may currently be utilizing 30% of the sampled cache lines while process 2 may be currently utilizing 5% of the sampled cache lines.

When a cache line that includes the RMID field is modified and the value in the RMID field changes, the overall utilization percentages change. In some embodiments, the update to the one or more process resource tables that store RMID cache line occupancy count information is done dynamically as the cache line is modified. In other embodiments, the update to those one or more process resource tables is done as a refresh to the entire table(s) after an interval timer expires.

When a request for cache line monitoring information is received, the utilization information may be compiled differently in different embodiments. The cache line occupancy count information may be aggregated across all process resource tables, it may be estimated by extrapolating the occupancy count information from a nearest process resource table, it may be retrieved from a single centralized process resource table, or it may be retrieved from one specific process resource table among many due to a distribution of different RMIDs across several process resource tables.

Reference in the following description and claims to "one embodiment" or "an embodiment" of the disclosed techniques means that a particular feature, structure, or characteristic described in connection with the embodiment is included in at least one embodiment of the disclosed techniques. Thus, the appearances of the phrase "in one embodiment" appearing in various places throughout the specification are not necessarily all referring to the same embodiment.

In the following description and claims, the terms "include" and "comprise," along with their derivatives, may be used, and are intended to be treated as synonyms for each other. In addition, in the following description and claims, the terms "coupled" and "connected," along with their derivatives may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate, interact, or communicate with each other.

FIG. 1 illustrates an embodiment of a general purpose computer system to monitor cache usage in a distributed shared cache.

Computer system 100 is shown. The computer system may be a desktop, server, workstation, laptop, handheld, television set-top, media center, game console, integrated system (such as in a car), or other type of computer system. In several embodiments the computer system 100 includes a central processing unit (CPU) 102. The CPU 102 may be an Intel® Corporation CPU or a CPU of another brand. The CPU may include more than one core. In fact the CPU 102 may contain X cores of which core 0 (104), core 1 (106), and core X (108) are shown. Potentially, X may be any number greater than one. In many embodiments, each core (such as core 0 (104)) includes internal functional blocks such one or more execution units, retirement units, a set of general purpose and specific registers, etc.

CPU 102 may also include a cache 110. In different embodiments the cache may be apportioned in different ways. In some embodiments, the cache may be distributed by being broken up into slices, such as slice 0 (112), slice 1 (114), and slice Y (116). In many embodiments, each slice may be of equal size to the other slices, though in other embodiments different slices may be made up of different sizes. For example, cache 110 may be an 8 megabyte (MB) cache with four slices where each of the four slices (0-3) may comprise a 2 MB slice.

Additionally, each core may be granted the use of a single slice. In other embodiments, two or more cores may share a slice or a single core may be granted the use of several slices. But returning to the example where each core utilizes a single slice, X would therefore equal Y, thus core 0 (104) may specifically utilize slice 0 (112), core 1 (106) may specifically utilize slice 1 (114), and so on.

Furthermore, each slice may be a fully associative cache, an N-way set associative cache, or a cache constructed in another way. The number of ways of associativity in the cache may be implementation specific. For example, in a 16-way associative cache where the entire cache 110 is 8 MB and broken up into four slices, each comprising a 2 MB slice, and with 64 byte cache lines, there would be 2048 sets per slice. In this example, each of the 2048 sets would comprise 16 64-byte cache lines.

Returning to FIG. 1, in many embodiments, CPU 102 also includes a power and clock unit 118 that supplies power to the CPU 102 and provides a reference clock signal for the circuitry residing on CPU 102. Furthermore, CPU 102 may also include a QuickPath interconnect (QPI) unit 120. QPI 120 enables communication between CPU 102 and any other CPUs and/or potentially input/output (I/O) units within the computer system 100 (additional CPUs and the I/O subsystem are not shown in FIG. 1). CPU 102 also may include a memory controller 122 to provide an interface to communicate with system memory 124 across processor-memory interconnect 126. In other embodiments that are not shown, memory controller 122 may be a discrete device or integrated within another device within computer system 100.

System memory 124 may comprise dynamic random access memory (DRAM), such as a type of double data rate (DDR) DRAM, non-volatile memory such as flash memory, phase change memory (PCM), or another type of memory technology. The system memory 124 may be a general purpose memory to store data and instructions to be operated upon by CPU 102, other CPUs within computer system 100, and potentially other devices within computer system 100 (e.g., a direct memory access (DMA)-capable I/O device).

Processor-memory interconnect may include one or more optical, metal, or other wires (i.e. lines) that are capable of transporting data, address, control, and clock information.

Figure 2:
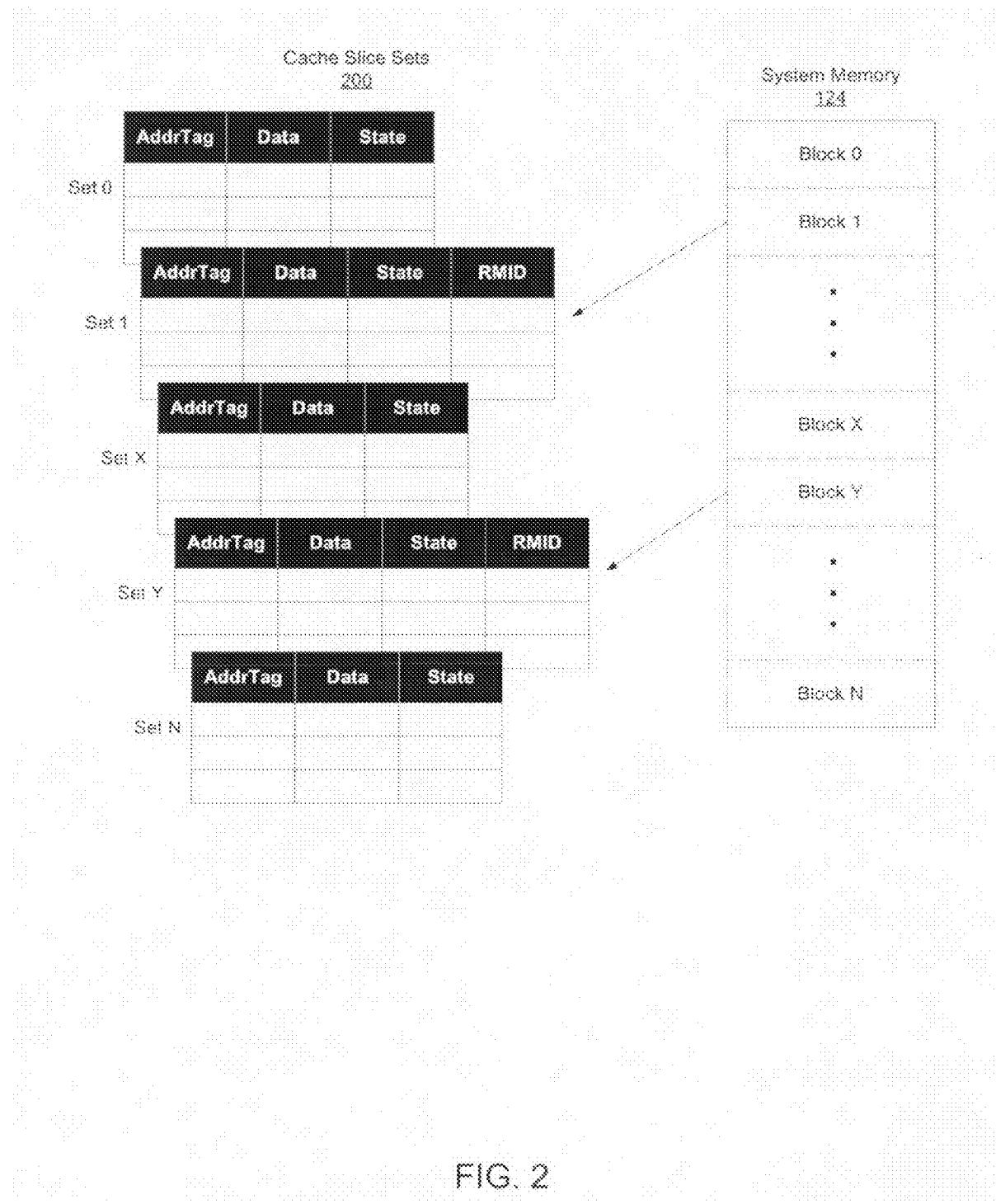
FIG. 2 illustrates an embodiment of the sets comprising a cache or a cache slice.

FIG. 2 illustrates an embodiment of the sets comprising a cache or a cache slice. As discussed above, cache 110 in FIG. 1 may be apportioned into several slices, each of which includes a fully functional cache utilized by a given core within CPU 102. Using the example discussed above, a 16-way 2 MB cache slice would include 2048 sets. Each set would include 16 separate 64-byte cache lines. This is just one of many possible implementations of the cache 110. Another example might be a 4-way 1 MB cache slice, which would include 4096 sets.

It would be possible to track a resource monitoring identification (RMID) for each cache line. An RMID would be an identifying brand for a given software application (i.e. a process) that is running on the computer system 100. For example, within a Microsoft® Windows® environment, each process running in the operating system is identified by a process ID, these IDs correspond and are unique to the processes that can be seen when opening a Windows® task manager. When a CPU such as CPU 102 performs a store or modify on a given cache line, the CPU 102 may store an RMID in the cache at that cache line. There may be a limit to the total number of processes running in the computer system at a given time. The limit for the number of processes would constitute the required bit-size of the RMID value. For example, if 64 processes were the limit, then the RMID field stored with each cache line would be a 6-bit field (i.e., $2^6=64$ possible combinations). This ID field can change size based on the limit of simultaneously running processes. Set 1 of the pictured cache slice sets 200 in FIG. 2 illustrates the added RMID field. Each cache line in set 1 includes the address tag field to index the specific cache line location, the data field to store the data, the state field to indicate whether the field has been modified, etc., and the RMID field to indicate which process running on computer system 100 owns this cache line.

As discussed above, in many embodiments, the cache 110 is set up using N-way associativity. And although it would be possible to track the RMID for every cache line in the entire cache, this 100% cache line tracking mechanism may not be cost-effective. Because cache line usage follows a generally random pattern, it may be more efficient to track a subset of the entire number of sets that make up the cache and still be relatively effective in determining the percentage of overall cache lines being utilized by each process. It is generally possible to get a snap shot of overall cache utilization per process by tracking the RMIDs of a small percentage of the total number of cache lines.

In many embodiments that utilize set associativity, the tracking can be performed on every Zth set, where Z is determined based on the total number of sets and the set sample size. For example, even a 3% set sampling rate may generate over a 90% accuracy of the actual process utilization of all cache lines. In the first cache size example, a 3% sampling rate would be 32 sets tracked out of 2048 total sets. If the RMID was 6-bits, the total space used in the 2 MB slice would be 384 bytes, which is a small fraction of the size of the cache.

As shown in FIG. 2, set 1 and set Y are two of the sampled sets that include the RMID field, while set 0, set X, and set N are 3 of the non-sampled sets. These sets map to specific blocks of system memory 124, but because physical system memory usage is generally a random distribution, tracking a subset of cache sets that correspond to a subset of blocks within the memory, the usage percentage per process should be quite accurate as a sample for the entire number of cache sets.

In many embodiments, logic within the CPU 102 keeps track of which sets track the RMIDs. For example, an internal table may provide information as to which sets include an RMID field per cache line. The table may include a single bit field per set that when set ("1") informs the CPU 102 that the given set includes RMID values and therefore requires the CPU to modify the RMID field if a process change is made. Alternatively, when the bit field is cleared ("0") the CPU 102 is informed that the given set does not include RMID values. In some embodiments, the sets that utilize the RMID field are preset and permanent. In other embodiments, the sets that utilize the RMID field are able to be determined through the table in a modifiable manner (e.g., including a setting to determine the sample percentage in the basic input/output system (BIOS)).

After the sampled sets are selected for monitoring, there are several embodiments that may be utilized to obtain the monitoring information to provide to an operating system (OS). FIG. 3A through FIG. 3E illustrate different embodiments for retrieving monitoring information.

Figure 3A:
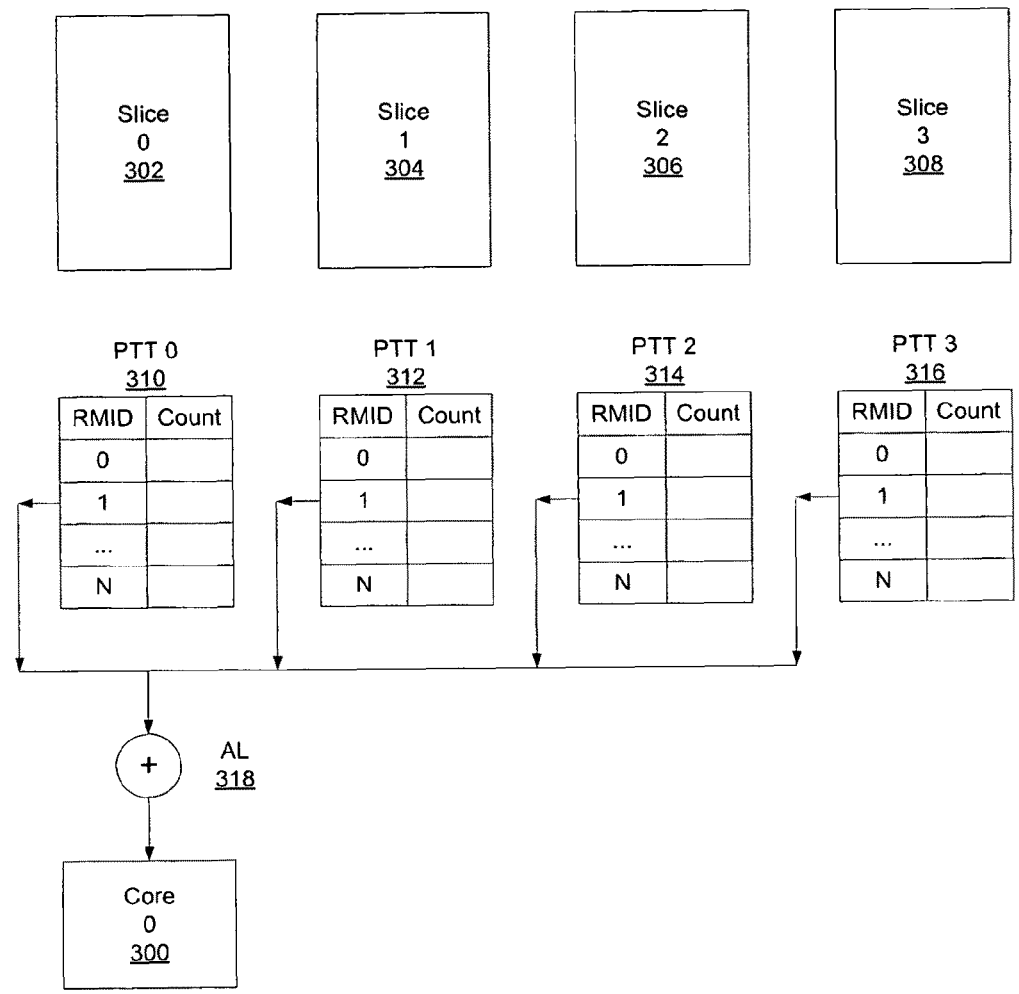
FIG. 3A illustrates an embodiment of an aggregate-on-demand resource monitoring collection scheme.

FIG. 3A illustrates an embodiment of an aggregate-on-demand resource monitoring collection scheme. Initially, a process resource table (PRT) is created for each cache slice. E.g., slice 0 (302) has PRT 0 (310), slice 1 (304) has PRT 1 (312), slice 2 (306) has PRT 2 (314), and slice 3 (308) has PRT 3 (316). A PRT is a table that includes a column specifying each RMID and a corresponding column that stores the cache line occupancy count for each RMID. Specifically, the "occupancy" count refers to the number of cache lines storing data, or in other words, occupied with data, related to a given process (i.e. software application running on the computer system).

In some embodiments, when a cache line that is being monitored (i.e., the cache line is in one of the sampled sets) is updated, the CPU core updating the cache line must first check to see which process was already utilizing the cache line. If the cache line is updated by the same process, then no change is required to the PRT. On the other hand, if the process utilizing the cache line changes, then the PRT needs to be updated. In this scenario, the CPU core first decrements the cache line count of the process identified by the current RMID utilizing the cache line. Then the CPU core increments the cache line count of the process RMID that is newly utilizing the cache line in question. Thus, the PRT linked to the cache slice with the updated cache line now has two updated RMID cache line counts upon completion of the update. This updating process continues dynamically as the cache is being utilized during operation. Obviously, if a cache line being updated does not fall within the group of sample sets that track the RMID, then the updating process is not performed.

In many embodiments, the CPU core performing the updating of the PRT is the core that is allocated the specific cache slice linked to the PRT in question. For example, in FIG. 3A, core 0 (300) may be limited to performing updates to PRT 0 (310) if it has only cache slice 0 (302) available to it. In other embodiments, if core 0 (300) is allowed to make modifications to cache lines within the other slices (1-3), then core 0 (300) may also be allowed to update PRT 1-3.

In other embodiments, each PRT is updated at a preset timing schedule. For example, instead of having a core dynamically update a PRT when a monitored cache line changes processes, the core simply writes in the new RMID value in the given monitored cache line and leaves the PRT alone. Then, after a set interval, the operating system may request one or more cores to read the RMID values for every cache line that is monitored and update all rows of all PRTs at once. Thus, for each cache line update, the process is simpler because no PRT modification is required, but then after a certain interval, the OS requires the PRTs to refresh to current cache line counts and the refresh process after the interval would require more extensive processing time, though this refresh would generally require less frequent modifications to the PRTs. The length of the time interval between each full PRT refresh may be implementation specific. In some embodiments, this time interval may be settable through a register, such as a BIOS or OS-accessible register.

Returning to FIG. 3A, to retrieve resource monitoring information related to the cache, core 0 (300) may check to see the cache line usage of a given process (i.e., a software application with a specific RMID). For example, an OS may request core 0 (300) to retrieve the percentage of cache lines utilized by process 1 (i.e., RMID 1). In an aggregate-on-demand resource monitoring collection scheme, upon receiving a request to retrieve the cache line count for RMID 1, core 0 (300) reads the RMID 1 count from each of the PRTs (0-3). These values are then aggregated in aggregation logic (AL) 318 and a total count across all PRTs is provided to core 0 (300). The total count provides a sample percentage of the overall cache utilization for the RMID 1 process. Overall cache utilization refers to the utilization across all cache slices (i.e., AL 318 adds the cache line counts for all sample sets across all cache slices). AL 318 may be incorporated within each core (not shown) or be implemented in a central uncore within the CPU. An uncore includes logic within the CPU that is external to each core (e.g., the QPI interface unit 120 in FIG. 1 may be logic that would be located within CPU 102's uncore).

Figure 3B:
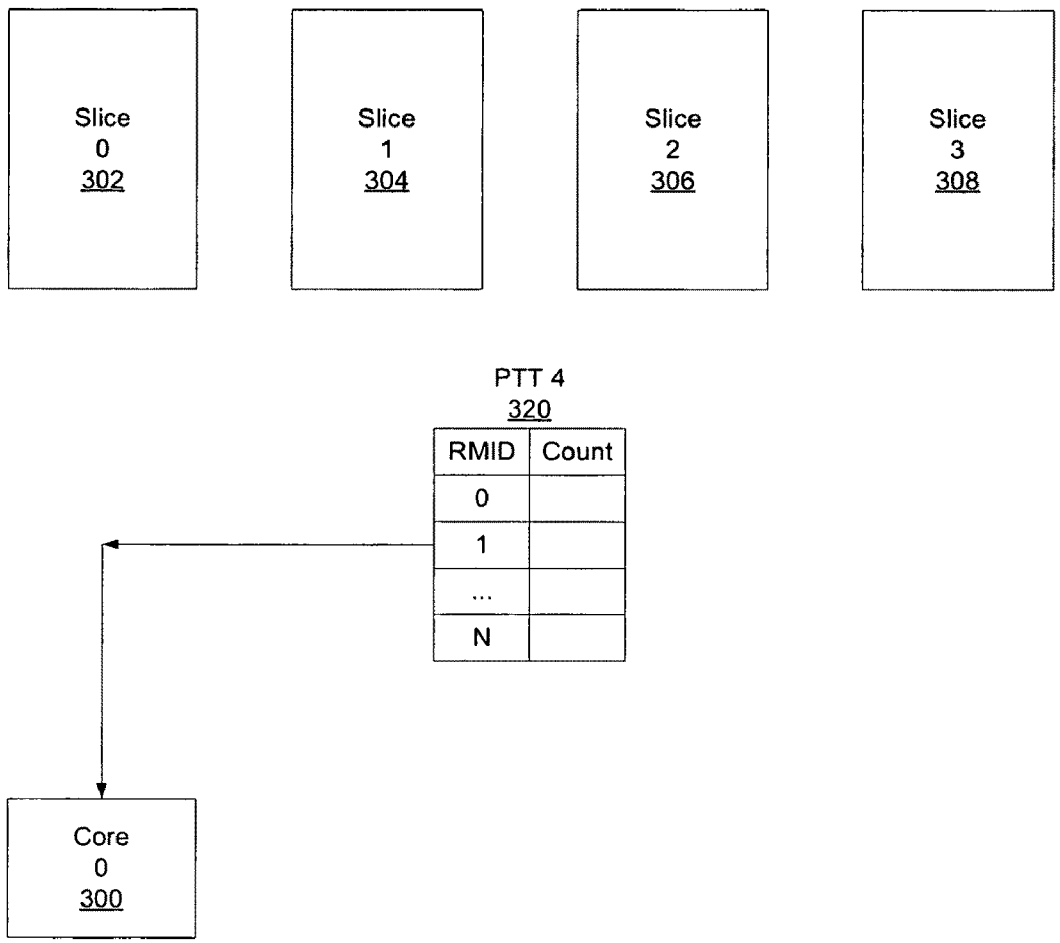
FIG. 3B illustrates an embodiment of an aggregate-in-slow-loop resource monitoring collection scheme.

FIG. 3B illustrates an embodiment of an aggregate-in-slow-loop resource monitoring collection scheme. Instead of separate PRTs per cache slice (as was described above in reference to FIG. 3A), FIG. 3B includes a single centralized PRT. In this embodiment, PRT 4 (320) maintains the total RMID counts across all cache slices. For example, the count maintained in PRT 4 for RMID 1 includes the total number of cache lines within the sample sets that are being utilized by the RMID 1 process for slices 0-3 (302-308).

In some embodiments, PRT 4 is updated dynamically for each cache line RMID change. In other embodiments, PRT 4 utilizes the interval refresh scheme to modify the entire table once every set interval.

This central PRT scheme would require less storage space because there would be one table instead of multiple tables to store. Though, the centralized PRT may have an amount of contentious overhead if dynamic updating of the table per cache line update were taking place and simultaneous updates to the same RMID row by two or more cores were to take place. An update queue for PRT 4 (320) may be implemented to alleviate any potential issues.

Figure 3C:
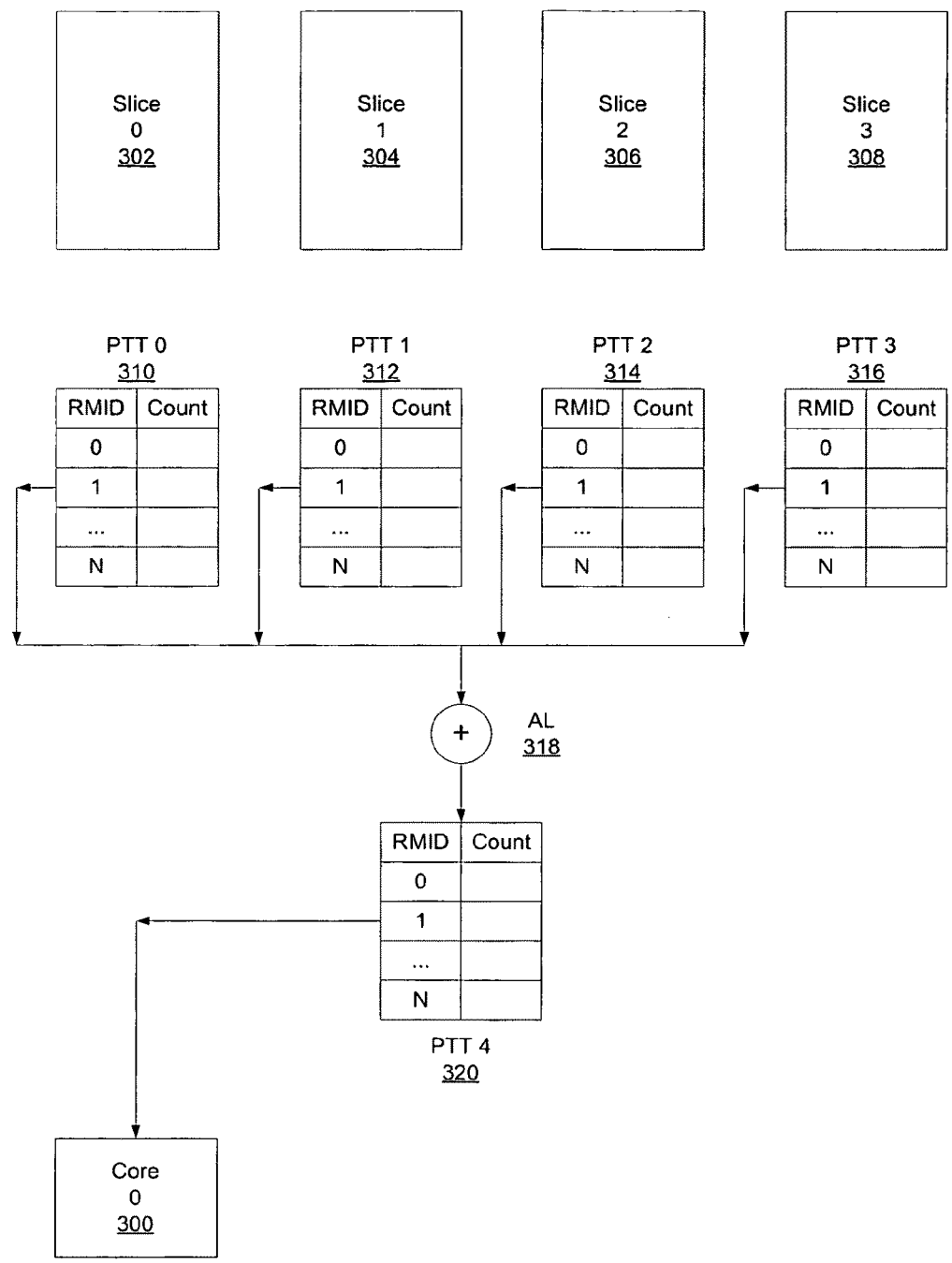
FIG. 3C illustrates an embodiment of an aggregate-in-slow-loop with hidden individual slice Process Resource Tables (PRTs) resource monitoring collection scheme.

FIG. 3C illustrates an embodiment of an aggregate-in-slow-loop with hidden individual slice PRTs resource monitoring collection scheme. Instead of just separate PRTs per cache slice (as was described above in reference to FIG. 3A), or just a single centralized PRT (as was described above in reference to FIG. 3B), in this embodiment, there is a combination of PRTs implemented in FIG. 3A and FIG. 3B.

Initially, a PRT is created for each cache slice. E.g., slice 0 (302) has PRT 0 (310), slice 1 (304) has PRT 1 (312), slice 2 (306) has PRT 2 (314), and slice 3 (308) has PRT 3 (316). In some embodiments, PRTs 0-3 maintain real-time occupancy counts for each RMID. Although in FIG. 3C, PRTs 0-3 are not exposed to any cores for acquiring the individual slice occupancy count information. Rather, there is a separate aggregated PRT (PRT 4 (320)) that holds the sum of each RMID occupancy count of PRTs 0-3. Logic maintaining the aggregate RMID occupancy counts in PRT 4 (320) performs an update periodically. This update potentially takes place after an interval timer expires, then the interval timer is reset to begin counting down to the next update.

In this embodiment, the data in PRT 4 (320) may not always be the most up to date (i.e. the data potentially may be stale). The average age of the data depends on the length of the interval timer period. This may be a predetermined period of time or a user determined period of time that may be set in BIOS or elsewhere.

When the interval timer expires, AL 318 reads the value in PRTs 0-3 at each RMID value, adds those values together, and comes up with a resulting aggregate occupancy count for each RMID, which is then stored in PTT 4 (320). When a core wants to retrieve the aggregate occupancy count value of a given RMID, the core (such as Core 0 (300)) accesses the relevant RMID row in PTT 4 (320).

Figure 3D:
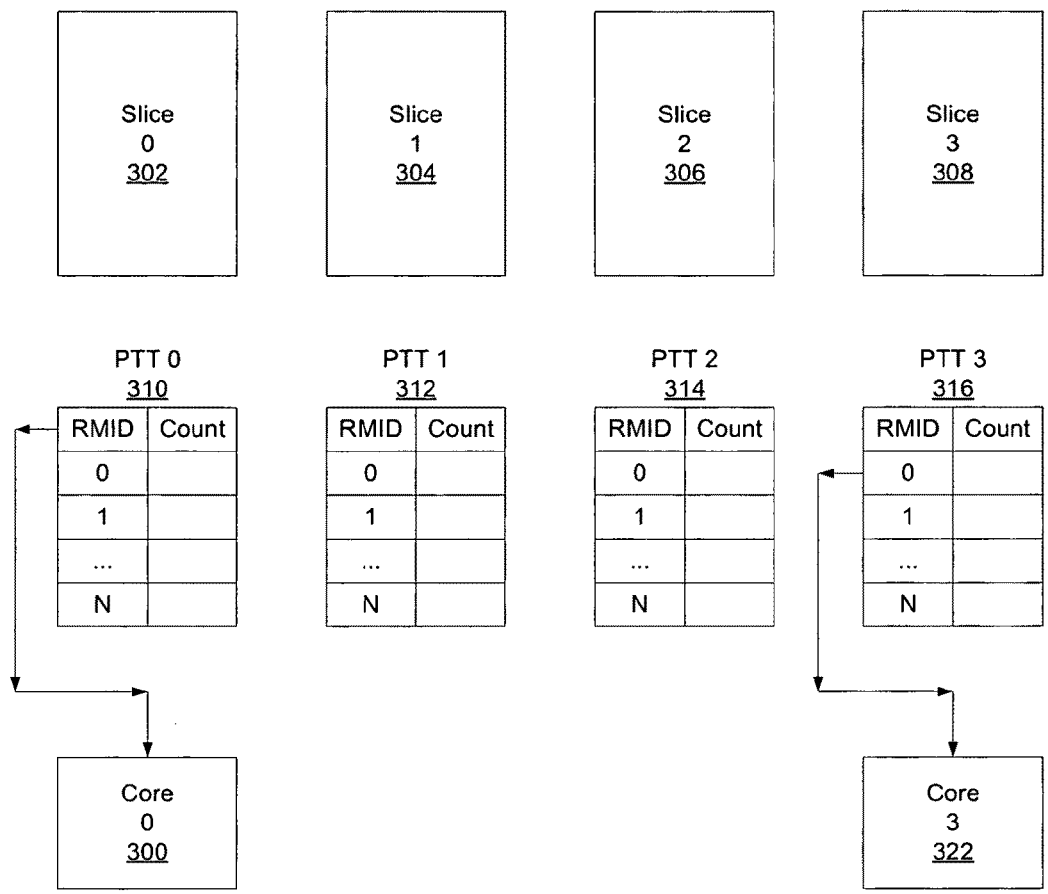
FIG. 3D illustrates an embodiment of a nearest PRT value resource monitoring collection scheme.

FIG. 3D illustrates an embodiment of a nearest PRT value resource monitoring collection scheme. As in FIG. 3A, FIG. 3D includes a PRT for each cache slice. E.g., slice 0 (302) has PRT 0 (310), slice 1 (304) has PRT 1 (312), slice 2 (306) has PRT 2 (314), and slice 3 (308) has PRT 3 (316). Although, in FIG. 3D, instead of utilizing aggregation logic to add all counts for the given RMID value in question, each core may simply utilize the cache line count for the RMID value stored in the nearest PRT. For an operating system utilizing standard physical memory allocation algorithms, the distribution of a given application across the memory would be significantly random and thus, each cache slice may exhibit similar utilization patterns as the other slices. Thus, although in a four slice configuration core 0 (300) in FIG. 3D would essentially receive 25% of the volume of sample set data that that it would receive through aggregation logic in FIG. 3A, the cache line count utilization percentage of each process exhibits a similar distribution for each slice. Thus, by viewing a given RMID cache line utilization percentage within the PRT associated with a single slice, the RMID cache line utilization percentage of all slices can be estimated by extrapolating the total cache utilization percentage from the single slice utilization percentage.

To illustrate the nearest PRT value collection scheme, FIG. 3D shows that core 0 (300) receives RMID information specifically from PRT 0 (310) and core 3 (322) receives RMID information specifically from PRT 3 (316). Other cores could be shown retrieving RMID information from PRTs 1 and 2.

In some embodiments, at certain set intervals, the OS or possibly hardware logic implemented in the uncore may cause a sanity check to take place to verify that the cache line utilization distribution of RMIDs is within a threshold of a similar percentage distribution for each PRT. If one or more of the PRTs have different relative cache line process usage percentages that exceed a threshold, then the OS or the hardware logic may reinstitute the aggregation method of FIG. 3A (or another alternative monitoring method) or cause a warning to alert the potential unknown discrepancy in monitoring information across cache slices.

Figure 3E:
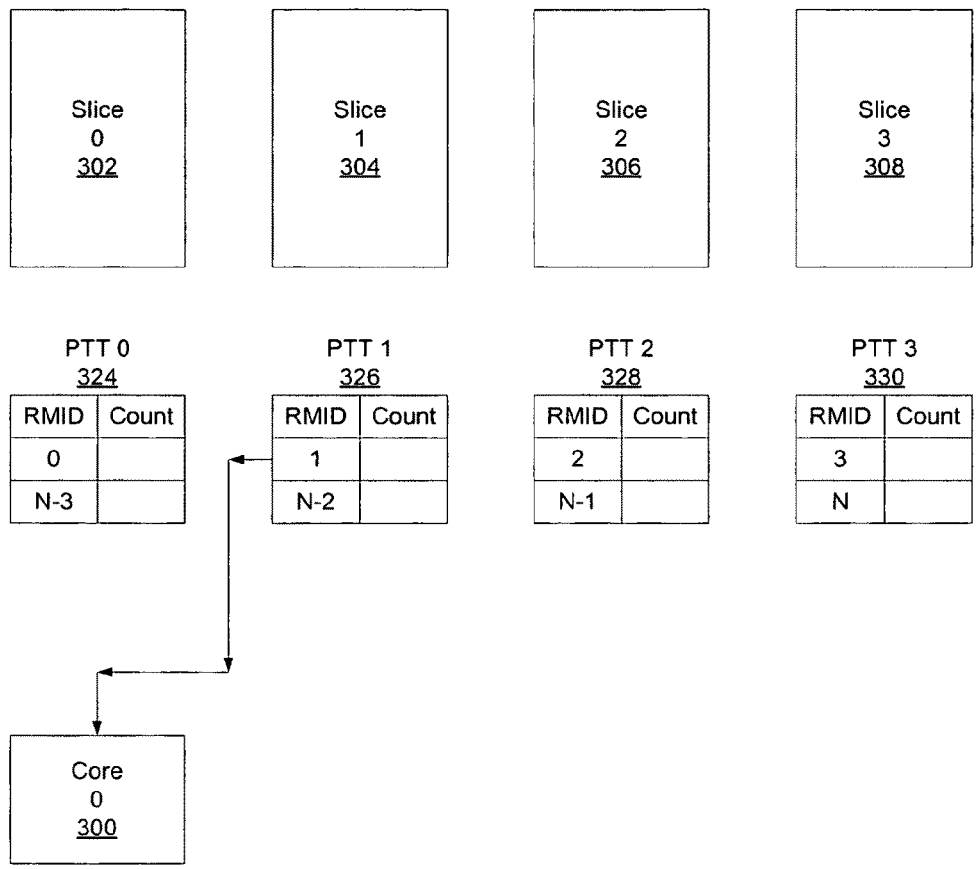
FIG. 3E illustrates an embodiment of a distributed resource monitoring collection scheme.

FIG. 3E illustrates an embodiment of a distributed resource monitoring collection scheme. Each PRT in FIG. 3E does not monitor all RMIDs. Instead, the combination of all PRTs include one complete set of RMID values and each separate PRT comprises a partial PRT (i.e., a PRT that stores cache line occupancy counts for less than the entire set of RMIDs). For example, if there are 0-N RMIDs being tracked, PRT 0 (324) may store every fourth RMID, such as RMID 0, RMID N-3, and so on. PRT 1 (326) may store RMID 1, RMID N-2, etc. PRT 2 (328) may store RMID 1, RMID N-2, etc. PRT 3 (330) may store RMID 1, RMID N-2, etc. Thus, in this implementation, if core 0 (300) requires the RMID 1 cache line count, core 0 (300) performs a read from PRT 1 (326).

In many embodiments, each core stores the predetermined locations of each RMID (e.g., for each RMID, the location of the specific PRT storing the RMID information). Thus, if a core needs to retrieve a specific RMID cache line count, the core can perform a look up to determine which PRT stores the needed count and then a read request to the determined PRT is made.

In different embodiments, PRTs shown in FIG. 3A through FIG. 3E may be stored in cache slices, in the CPU uncore, in each respective CPU core, or elsewhere within the computer system.

FIG. 4A is a flow diagram of an embodiment of a process to dynamically update a PRT when an RMID is modified in a sampled set. The process is performed by processing logic which may include hardware (e.g., circuitry within a CPU), software (e.g., an OS routine), firmware (e.g., a BIOS or microcode routine), or a combination of two or more types of processing logic.

Turning to FIG. 4A, the process begins by processing logic modifying a cache line (processing block 400). For example, the modification could be writing new data to the cache line, though there may be other possible ways in which the cache line is modified including simply swapping RMID values from one process ID to another if the cache line is within a sampled set that is monitored.

Once the cache line has been modified, processing logic determines whether the cache line tracks RMIDs (processing block 402). This may be determined by performing a lookup to a table or other mechanism or data structure that identifies all sampled sets and their cache lines which are utilized in resource monitoring. This data structure may be stored by the OS or potentially in hardware (such as in the uncore or within each core). Among other potential ways to determine whether the particular modified cache line stores an RMID field would be to view the cache itself. For example, each cache set may include a bit field that indicates whether the cache lines in the set track the RMID values.

If processing logic determines that the modified cache line does not track RMIDs, then the process is finished. Otherwise, if RMIDs are tracked, then processing logic determines whether the RMID has changed for the specific cache line (processing block 404). In many embodiments, to check this processing logic reads the process ID already stored in the RMID field for the cache line and compares it to the process ID in the OS that generated the request to modify the cache line.

If processing logic determines that the RMID value is the same, then the process is finished. Otherwise, if the RMID value is different, then processing logic locates the PRT storing the cache line count for the specific RMID value (processing block 406). The location can be determined in a number of ways, but it implementation specific based on the type of resource monitoring collection scheme. Four separate resource monitoring collection schemes (and the locations of the respective PRTs) are described in detail above in relation to FIG. 3A through FIG. 3E.

When the PRT storing the RMID data is located, processing logic then decrements the cache line count in the PRT for the prior RMID value stored in the cache line (processing block 408). This count is decremented because the cache line that is modified no longer is being utilized by the old process ID and therefore, that process ID is utilizing one less monitored cache line and the cache line count needs to be decremented to reflect this change.

Next, processing logic increments the cache line count at the new RMID value of the cache line in the PRT (processing block 410) and the process is finished.

FIG. 4A as stated uses a dynamic PRT update approach where the PRT is updated each instance a monitored cache line changes RMID values. Alternatively, FIG. 4B is a flow diagram of an embodiment of a process to update a PRT on an interval basis. The process is performed by processing logic which may include hardware, software, firmware, or a combination of two or more types of processing logic.

Turning to FIG. 4B, the process begins by processing logic determining whether an interval timer has elapsed (processing block 412). The interval timer may be an internal timer kept by circuitry within the CPU uncore, within each core, or alternatively may be a system timer kept by the OS or other firmware. Once the timer has elapsed, that signals processing logic to perform a refresh of the entire PRT (or multiple PRTs in certain implementations).

If the timer has not elapsed, processing logic returns to block 412. Otherwise, if the timer has elapsed, then processing logic sets the current RMID (i.e., "current RMID" may be just thought of as a variable used to traverse the PRT) at zero (processing block 414). Next, processing logic checks the entire number of cache lines in the sampled sets to see how many of them are being utilized by the process ID of the current RMID value (processing block 416). In other words, these cache lines are counted.

Then processing logic updates the cache line count in the PRT at the current RMID value with the just counted value (processing block 418). At this point, processing logic determines whether the current RMID is at the last RMID in the PRT (processing block 420). If the current RMID is the final RMID in the PRT, then processing logic has completed traversing and updating all rows in the PRT and the process is finished. Otherwise, if the current RMID is not the last RMID in the PRT, then processing logic increments the current RMID to get to the next row in the PRT for updating (processing block 422) and the cache line count process is then performed on the next RMID value starting at block 416.

FIG. 5A through FIG. 5D are process flow diagrams that are related to the resource monitoring schemes described in FIG. 3A through FIG. 3E, respectively.

Figure 5A:
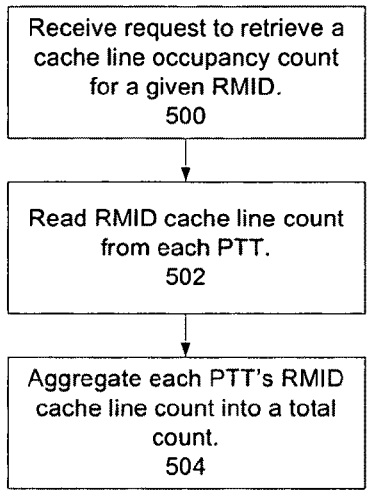
FIG. 5A is a flow diagram of an embodiment of an aggregate-on-demand resource monitoring collection process.

FIG. 5A is a flow diagram of an embodiment of an aggregate-on-demand resource monitoring collection process. The process is performed by processing logic which may include hardware, software, firmware, or a combination of two or more types of processing logic.

Turning to FIG. 5A, the process begins by processing logic receiving a request to retrieve a cache line occupancy count for a given RMID (processing block 500).

Next, processing logic reads the cache line count at the RMID value from each PRT (processing block 502).

Finally, processing logic aggregates each PRT's cache line count at the RMID value into a total count (processing block 504). At this point the current cache line utilization among all RMIDs is known across the sample sets and the process is finished.

Figure 5B:
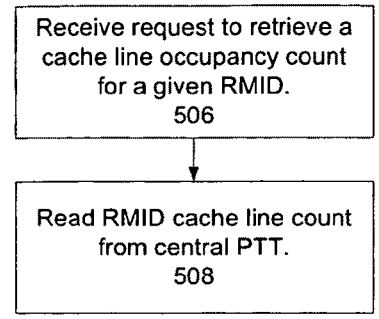
FIG. 5B is a flow diagram of an embodiment of an aggregate-in-slow-loop resource monitoring collection process.

FIG. 5B is a flow diagram of an embodiment of an aggregate-in-slow-loop resource monitoring collection process. The process is performed by processing logic which may include hardware, software, firmware, or a combination of two or more types of processing logic.

Turning to FIG. 5B, the process begins by processing logic receiving a request to retrieve a cache line occupancy count for a given RMID (processing block 506).

Next, processing logic reads the cache line count at the RMID value from the central PRT (processing block 508). At this point the current cache line utilization among all RMIDs is known across the sample sets and the process is finished.

Figure 5C:
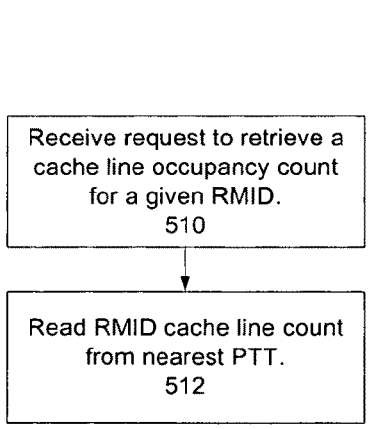
FIG. 5C is a flow diagram of an embodiment of a nearest PRT value resource monitoring collection process.

FIG. 5C is a flow diagram of an embodiment of a nearest PRT value resource monitoring collection process. The process is performed by processing logic which may include hardware, software, firmware, or a combination of two or more types of processing logic.

Turning to FIG. 5C, the process begins by processing logic receiving a request to retrieve a cache line occupancy count for a given RMID (processing block 510).

Next, processing logic reads the cache line count at the RMID value from the nearest PRT (processing block 512). At this point the current cache line utilization among all RMIDs is known for the nearest PRT, which tracks a single cache slice, and the current cache line utilization among all RMIDs across all sample sets for all cache slices can be estimated and the process is finished.

Figure 5D:
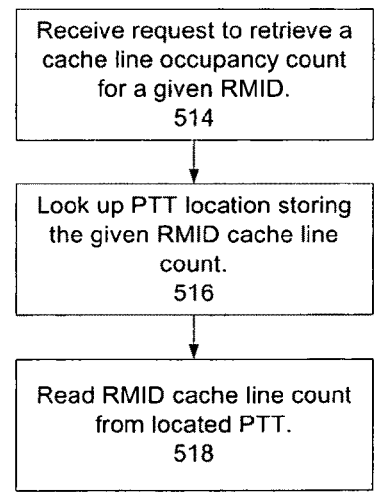
FIG. 5D is a flow diagram of an embodiment of a distributed resource monitoring collection process.

FIG. 5D is a flow diagram of an embodiment of a distributed resource monitoring collection process. The process is performed by processing logic which may include hardware, software, firmware, or a combination of two or more types of processing logic.

Turning to FIG. 5D, the process begins by processing logic receiving a request to retrieve a cache line occupancy count for a given RMID (processing block 514).

Next, processing logic looks up the location of the PRT storing the cache line occupancy count (i.e., cache line utilization) of the given RMID (processing block 516). Once the PRT is located, then processing logic reads the cache line count for the RMID value from the located PRT (processing block 518) and the process is finished.

Thus, embodiments of an apparatus, method, and system for monitoring cache usage in a distributed shared cache are described. These embodiments have been described with reference to specific exemplary embodiments thereof. It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

We claim:

1. An apparatus, comprising:
   a cache memory, wherein the cache memory comprises a total number of sets, each set including at least one cache line; and
   a first process resource table to maintain a first occupancy count indicating a number of cache lines, within a first subset of the total number of sets, storing information utilized by at least one of a plurality of processes;
   a second process resource table to maintain a second occupancy count indicating a number of cache lines, within a second subset of the total number of sets, storing information utilized by at least one of a plurality of processes; and
   a processor core to:
      update the first process resource table when the processor core changes a utilization of a cache line in the first subset from a first process to a second process; and
      indicate a combined number of cache lines utilized with a given process of the plurality of processes by performing an operation selected from:
         adding the occupancy count of cache lines utilized by the given process for the first and second process resource tables; and
         estimating the combined number of cache lines by extrapolating the occupancy count of cache lines utilized by the given process from the first processor resource table.

2. The apparatus of claim 1, wherein the cache memory is divided into a plurality of slices, each of the plurality of slices including more than one of the plurality of the cache lines.

3. The apparatus of claim 2, wherein the at least one process resource table comprises a partial process resource table for each cache slice of the plurality of slices, wherein each partial process resource table maintains the occupancy count of a subset of the plurality of processes.

4. The apparatus of claim 2, wherein the processor core is one of a plurality of processor cores, each processor core of the plurality of processor cores being associated with at least one of the plurality of cache slices.

5. The apparatus of claim 2, further comprising:
   a processor core to update the first process resource table with current cache line occupancy counts when an interval timer expires.

6. The apparatus of claim 1, wherein the processor is further operable to update the second process resource table when the processor core changes a utilization of a cache line in the second subset from a first process to a second process.

7. A method, comprising:
- receiving a request for a cache line occupancy count of a process identification (ID) in a cache memory, wherein the cache memory comprises a total number of sets, each set including a plurality of cache lines;
- reading a cache line occupancy count value at the process ID location in a first process resource table associated with the cache memory, wherein the first process resource table stores the occupancy count of cache lines for a first subset of less than the total number of cache lines in the cache memory;
- reading a cache line occupancy count value at the process ID location in a second process resource table associated with the cache memory, wherein the second process resource table stores the occupancy count of cache lines for a second subset of less than the total number of cache lines in the cache memory; and
- indicating a combined number of cache lines utilized by a given process of the plurality of processes by performing an operation selected from:
  - adding the occupancy count of cache lines associated with the given process for all process resource tables; and
  - estimating the combined number of cache lines by extrapolating the occupancy count in the first process resource table.

8. The method of claim 7, wherein the cache memory is divided into a plurality of slices, each of the plurality of slices including more than one of the plurality of the cache lines.

9. The method of claim 8, further comprising:
- updating one of the first process resource table and the second process resource table when the processor core swaps a utilization of a cache line of the plurality of cache lines from a first process to a second process.

10. The method of claim 9, wherein each cache slice of the plurality of slices is associated with at least one process resource table.

11. The method of claim 9, wherein the first process resource table comprises a partial process resource table for each cache slice of the plurality of slices, wherein each partial process resource table maintains the occupancy count of a subset of the plurality of process.

12. The method of claim 11, wherein the processor core is one of a plurality of processor cores, each processor core of the plurality of processor cores being associated with at least one of the plurality of cache slices.

13. The method of claim 8, further comprising:
- updating the first process resource table with current cache line occupancy counts when an interval timer expires.

14. A system, comprising:
- a system memory; and
- a multi-core processor including
  - a multi-slice cache memory, wherein each slice of the multi-slice cache memory comprises a number of sets, each set of the number of sets including a plurality of cache lines; and
  - at least one process resource table to maintain a cache line occupancy count of a number of cache lines storing information utilized by at least one of a plurality of processes, wherein the at least one process resource table stores the occupancy count of cache lines that are a subset of less than the total number of cache lines in the multi-slice cache memory;
- wherein the multi-core processor is further operable to:
  - update the at least one process resource table when the processor core swaps a utilization of a cache line of the plurality of cache lines from a first process to a second process;
- wherein the at least one process resource table comprises one process resource table for each cache slice in the multi-slice cache memory, and wherein the multi-core processor is further operable to aggregate a combined number of cache lines utilized with a given process of the plurality of processes by adding the occupancy count of cache lines utilized by the given process for all slice process resource tables.

15. The system of claim 14, wherein the multi-core processor is further operable to estimate a combined number of cache lines utilized with a given process of the plurality of processes by retrieving the occupancy count of cache lines utilized by the given process for a single slice process table and extrapolating the single slice occupancy count to an estimated occupancy count for all slices in the multi-slice cache memory.

16. The system of claim 14, wherein the at least one process resource table comprises a partial process resource table for each cache slice of the plurality of slices, wherein each partial process resource table maintains the occupancy count of a subset of the plurality of processes.

17. The system of claim 14, further comprising:
- an interval timer,
- wherein the multi-core processor is further operable to update the at least one process resource table with current cache line occupancy counts when the interval timer expires.

* * * * *